Patented Sept. 5, 1922.

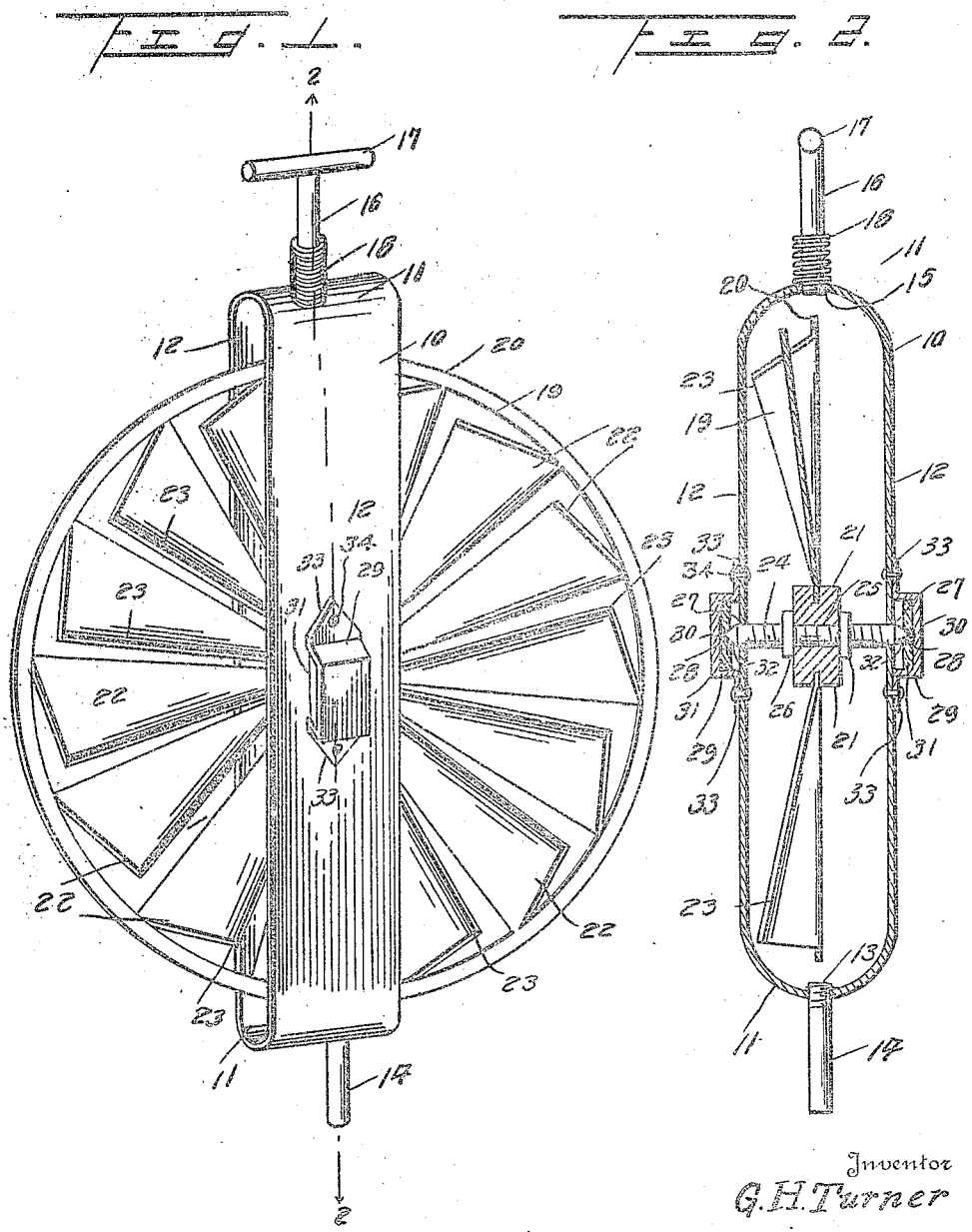

1,427,868

UNITED STATES PATENT OFFICE.

GILBERT H. TURNER, OF PORT CHESTER, NEW YORK.

DAMPER.

Application filed December 30, 1921. Serial No. 525,828.

*To all whom it may concern:*

Be it known that I, GILBERT H. TURNER, a citizen of the United States, residing at Port Chester, in the county of Westchester and State of New York, have invented certain new and useful Improvements in a Damper; and I do hereby declare the following to be a full, clear, and exact description of the invention, such as will enable others skilled in the art to which it appertains to make and use the same.

This invention relates to a damper for stove pipes or discharge flues of fireboxes.

An important object is to provide a construction which will enable a material saving in the quantity of fuel consumed to be effected.

Another object is to provide a damper embodying a novel wheel and mounting means for rotation through impingement by heat and the draft when in a closed position in order to function to maintain the fire at a normal heat.

Additional objects are to provide swivelled frame, and means thereon mounting glass bearings for the shaft or spindle of the wheel.

Other objects and advantages will become apparent from a consideration of the description following taken in connection with accompanying drawing illustrating one practical embodiment.

In said drawing:—

Figure 1 is a perspective view of the damper; and

Figure 2 is a central sectional view on the line 2—2 of Figure 1.

Like reference characters designate like or similar parts in both views.

In reducing the invention to practice, a suitable frame is provided such as the rectangular one illustrated at 10 and consisting of ends 11 and sides 12. Screwed into one of the ends 11 as by screw threads at 13, is a stud or trunnion 14. Diametrically opposite to the trunnion 14 and screwed as at 15 in the other end 11 is a trunnion or rod 16 having a manipulating handle 17 at its free end. Trunnions 14 and 16 are journaled or swiveled in a stove pipe or the equivalent as usual and an expansive coil spring 18 surrounds the trunnion 16 and is adapted to frictionally bear against the adjacent wall of the stove pipe in order to exert sufficient pressure or friction to hold the frame 10 in adjusted positions.

Within the frame 10 a suitable wind wheel 19 is journaled. This wheel may be of any suitable construction but as shown is preferably struck from a single sheet or blank of metal. It consists of an outer rim 20, a hub 21 and radial blades 22 which at free edges 23 are struck out of the plane of the disk or deflected, so that they will be substantially angularly disposed for impingement by air and heat.

A spindle 24 passes through an opening 25 of the hub 21 and nuts 26 are mounted on the spindle 24 for engagement against opposite sides of the hub 21 in order to rigidly connect the wheel 19 to the spindle.

Spindle 24 passes through openings 27 in the sides 12 and it has terminal conical bearing ends 28.

Suitable brackets 29 have offset portions 30 which mount and retain bearings 31, preferably of glass, recessed at 32 to correspond to the conical ends 28. Said brackets 29 have attaching flanges and tangs 33. Fastening rivets or bolts 34 are adapted to be passed through the tangs 33 and the sides 12 to mount the brackets in place and with the recesses 32 opposite the openings 27. Said ends 28 enter the recesses 32 as bearings for spindle 24.

It will be realized that due to the mounting of the spindle 24 in the bearings 31, that the wheel 19 is mounted for free rotation.

With the device installed in a stove pipe or the outlet flue, it is adapted to be manipulated as usual, namely through the turning of handle 17 which will vary the plane of disposition of the wheel 19 and proportionately throttle the stove pipe or flue. When the wheel 19 is open, the same is more or less inactive or stationary. When the damper is closed, however, the heat and draft through impingement against the blades 22 causes the wheel 19 to revolve which serves to hold or maintain the fire at a normal heat which results in the controlling of the fire in such manner as to materially reduce the quantity of coal consumed by the fire with which it is associated.

It will be understood that changes may be made within the spirit and scope of the invention since merely one practical embodiment has been illustrated and described.

I claim as my invention:—

1. A damper consisting of a draft-operable wheel for disposition in the draft line, a frame, means to mount the wheel on and for rotation relatively to said frame, and means to adjustably mount said frame.

2. A damper consisting of a draft-operable wheel, a frame, a spindle extending from said wheel journaled in said frame, and means to adjustably mount said frame.

3. A damper consisting of a draft-operable wheel, a frame, a spindle extending from said wheel journaled in said frame, means to adjustably mount said frame, consisting of trunnions, and one of said trunnions having a handle thereon.

4. A damper consisting of a draft-operable wheel for disposition in the draft line, a frame having openings therethrough, a spindle extending from the wheel passing through said openings, and bearings for said spindle exteriorly of said openings.

5. A damper consisting of a draft-operable wheel for disposition in the draft line, a frame having openings therethrough, a spindle extending from the wheel passing through said openings, bearing for said spindle exteriorly of said openings, the terminals of said spindle being substantially conical, and the bearings having recesses for said terminals conforming in shape thereto.

6. A damper consisting of a draft-wheel for disposition in the draft line, a frame, means to adjustably mount said frame, a spindle, said wheel being disposed on said spindle, nuts on said spindle engaging opposite sides of said wheel, said frame having openings therethrough, said spindle extending through and beyond said openings, the terminals of said spindle substantially conical, brackets secured against the exterior of said frame, said brackets having offset portions, bearing members in said offset portions, and said bearing members having substantially conical recesses receiving the terminals of said spindle.

In testimony whereof I affix my signature in presence of two witnesses.

GILBERT H. TURNER.

Witnesses:
NEWTON S. JOHNSON,
GEORGE SEYMOUR.